United States Patent [19]

Krueger et al.

[11] Patent Number: 5,161,950
[45] Date of Patent: Nov. 10, 1992

[54] DUAL ALLOY TURBINE DISK

[75] Inventors: Daniel D. Krueger, Cincinnati; Bruce P. Bardes, Montgomery; Richard G. Menzies, Wyoming; Swami Ganesh, West Chester; Jeffrey F. Wessels, Cincinnati; Sulekh C. Jain, Cincinnati; Michael E. Sauby, Cincinnati, all of Ohio; Keh-Minn Chang, Schenectady, N.Y.

[73] Assignee: General Electric Company, Cincinnati, Ohio

[21] Appl. No.: 417,096

[22] Filed: Oct. 4, 1989

[51] Int. Cl.⁵ .............................................. B64C 11/04
[52] U.S. Cl. ........................... 416/204 R; 416/244 R; 29/889
[58] Field of Search ........... 416/241 R, 244 A, 244 R, 416/204 R, 204 A; 148/410; 415/200, 915; 29/889.2; 228/125, 265

[56] References Cited

U.S. PATENT DOCUMENTS

| | | | |
|---|---|---|---|
| 3,046,640 | 7/1962 | Singleton | 29/197 |
| 3,098,022 | 7/1963 | Karnie | 228/125 |
| 3,106,013 | 10/1963 | Rozmus | 29/470.1 |
| 3,219,748 | 11/1965 | Miller | 174/52 |
| 3,225,437 | 12/1965 | Stohr | 29/473.5 |
| 3,259,969 | 7/1966 | Tessman | 29/487 |
| 3,436,804 | 4/1969 | Broverman | 29/471.5 |
| 3,940,268 | 2/1976 | Catlin | 75/208 |
| 3,950,841 | 4/1976 | Conn | 228/125 |
| 4,094,453 | 6/1978 | Cook et al. | 228/265 |
| 4,333,671 | 6/1982 | Holko | 285/173 |
| 4,359,352 | 11/1982 | Ray et al. | 148/410 |
| 4,529,452 | 7/1985 | Walker | 148/11.5 |
| 4,579,602 | 4/1986 | Paulonis et al. | 148/11.5 |
| 4,581,300 | 4/1986 | Hoppin et al. | 428/546 |
| 4,608,094 | 8/1986 | Miller et al. | 148/11.5 |
| 4,680,160 | 7/1987 | Helmink | 419/6 |
| 4,787,821 | 11/1988 | Cruse et al. | 416/185 |
| 4,814,023 | 3/1989 | Chang | 148/410 |
| 4,820,353 | 4/1989 | Chang | 148/410 |
| 4,820,358 | 4/1989 | Chang | 148/410 |
| 4,825,522 | 5/1989 | Iwai et al. | 416/241 R |
| 4,867,812 | 9/1989 | Henry | 148/410 |

FOREIGN PATENT DOCUMENTS

| | | |
|---|---|---|
| 171344 | 12/1986 | European Pat. Off. |
| 1209478 | 10/1970 | United Kingdom . |
| 1337208 | 11/1973 | United Kingdom . |
| 1350972 | 4/1974 | United Kingdom . |
| 1486979 | 9/1977 | United Kingdom . |
| 1497360 | 1/1978 | United Kingdom . |
| 1534287 | 11/1978 | United Kingdom . |
| 2033813 | 5/1980 | United Kingdom . |
| 2028180 | 8/1980 | United Kingdom . |
| 1580474 | 12/1980 | United Kingdom . |
| 2059819 | 4/1981 | United Kingdom . |
| 1134120 | 11/1986 | United Kingdom . |
| 8800872 | 2/1988 | World Int. Prop. O. |

OTHER PUBLICATIONS

Van Vlack, Elements of Materials Science and Engineering, May 1985 pp. 493–495.

Primary Examiner—Edward K. Look
Assistant Examiner—Hoang Nguyen
Attorney, Agent, or Firm—Carmen Santa Maria; Jerome C. Squillaro

[57] ABSTRACT

A dual alloy disk made from a rim alloy having high stress rupture and creep resistance as well as good hold time fatigue crack resistance and a hub alloy having high tensile strength and good low cycle fatigue crack resistance is described. The dual alloy disk is designed for use as a disk in gas turbine engines operating as high as 1500° F. The hub and rim are joined together at a substantially defect-free joint to form a turbine disk having improved properties in both the hub and rim regions.

17 Claims, 1 Drawing Sheet

DUAL ALLOY TURBINE DISK

CROSS REFERENCES TO RELATED APPLICATIONS

The following commonly assigned applications are directed to related subject matter and are being concurrently filed with the present application, the disclosures of which are incorporated herein by reference: Ser. Nos. 07/416,095, 07/417,098, 07/417,097.

This invention relates in general to disks of the type used in gas turbine engines, and more specifically to dual alloy disks for gas turbine engines. Such disks are made from two separate portions, each portion being of a different alloy. The portions are then joined together to form an integral article.

BACKGROUND OF THE INVENTION

In gas turbine engines, disks which support turbine blades rotate at high speeds in an elevated-temperature environment. These turbine disks encounter different operating conditions radially from the center or hub portion to the exterior or rim portion. The turbine blades are exposed to high temperature combustion gases which rotate the turbine. The turbine blades transfer heat to the exterior portion of the disk. As a result, these temperatures are higher than those in the hub or bore portion. The stress conditions also vary radially across the disk.

Until recently, it has been possible to design single alloy disks capable of satisfying the varying stress and temperature conditions across the disk. However, the need in modern gas turbines for increased engine efficiency and improved engine performance now dictates higher engine operating temperatures. As a result, the turbine disks in these advanced engines are exposed to higher temperatures than in previous engines, placing greater demands upon the alloys used in disk applications. The temperatures at the exterior or rim portion may reach 1500° F., while the temperatures at the inner or hub portion will typically be lower, e.g., of the order of 1000° F.

In addition to this radial temperature gradient, there is also a stress gradient, with higher stresses occurring in the lower temperature hub region, while lower stresses occur in the higher temperature rim region in a typical disk. These differences in operating conditions radially across a disk result in different mechanical property requirements in the different disk regions, with the rim portion subjected to severe creep and hold time fatigue crack growth conditions and the hub portion subjected to severe fatigue and high stress conditions. In order to achieve the maximum operating conditions in terms of efficiency and performance in an advanced turbine engine, it is desirable to utilize disk alloys having excellent hold time fatigue crack growth resistance and high temperature creep resistance in the rim portion while having high tensile strength and fatigue crack-resistance at moderate temperatures in the hub portion.

Various solutions have been attempted to achieve a disk capable of meeting the demanding mechanical properties requirements encountered by a turbine disk in an advanced turbine engine at temperatures up to about 1500° F. One solution for meeting these higher operating temperatures required in these more efficient and more powerful advanced engines is to increase the weight of the disk made from an alloy having sufficient high temperature stability in order to reduce stress levels. This solution is unsatisfactory for aircraft due to the undesirable increase in the weight of the system which negates advantages of increased power and efficiency.

Another approach has been to make a single alloy disk whose different parts have different properties. U.S. Pat. No. 4,608,094 which issued Aug. 26, 1986, outlines a method for producing such a turbine disk. The disk is made from a single alloy which has been worked differently in different regions to yield different mechanical properties. However, such a disk is necessarily subject to the limitations of the single alloy employed. Alternatively, a single alloy disk may have different portions subjected to heat treatment at different temperatures, or at the same temperatures for different times as described in U.S. Pat. No. 4,820,358. Such a differential heat treatment will produce a disk having different mechanical properties in different portions. However, the disk is still subject to the previously mentioned limitations of the single alloy used.

U.S. Pat. No. 3,940,268 which issued Feb. 24, 1976, provides for turbine disk/blade assemblies. It discloses a disk of powdered metal material connected to a plurality of radially, outwardly-directed airfoil components located in a mold and metallurgically bonded during hot isostatic pressing ("HIP") formation of the disk element. While blades can be bonded to a disk of a different material by the method set forth in the '268 patent, hybrid or composite turbine rotor structures formed by such methods may lack precision and dimensional control between adjacent airfoil components. Such control is required to maintain the desired gas flow through adjacent passages of the airfoil components connected to the disk. The '268 patent does not, however, provide a means for joining separate portions of a disk.

Another approach is to use a dual alloy disk wherein different alloys are used in the different portions of the disk, depending upon the properties desired. The disk has a joint region in which the different alloys are joined together to form an integral article. Various methods for fabricating dual alloy disks have been suggested or evaluated. The heretofore previously known fabrication techniques for dual alloy disks have all been limited because of special problems related to configuration, cost or alloy composition. As employed herein, the term joint refers to a metallurgical joint wherein the joined members are held together by fusion of their metals or a third metal, as in the case of a diffusion braze or diffusion weld, as opposed to a mechanical joint wherein the joined members are held in contact by mechanical means such as bolts or rivets. The joint and region of altered metal adjacent thereto are referred to as the joint region.

The concept of forming a rim portion of a disk with a coarse grain and a central portion of a disk with a fine grain is disclosed in NASA Report No. CR-165224 entitled "Development of Materials and Process Technology for Dual Alloy Disks". The report indicates that the rim portion of a disk is formed from powdered metal by HIP of Powdered metal. The hub portion of the disk is then filled with metal powder and is enclosed in a container. The enclosed rim portion and the powdered metal are then subjected to a HIP operation to produce a dual alloy turbine disk. The disadvantage of HIP is that any impurities present at the joint prior to HIP will remain there. In a process analogous to HIP, two wrought sections are joined together by a HIP operation. This technique requires a gas-tight enclosure, such as a separate can, or a weld or a braze, around the exposed sides of the joint regions. In yet another variation of the HIP method, an annular ring of powder is placed between two wrought members and the assembly is subjected to HIP.

Fusion welding also has been suggested, but the nickel-base superalloys of the type used in disks are difficult to weld by this method.

Inertia welding is a Possible alternative. However, with very dissimilar alloys, there is a potential for uneven flow, inadequate joint clean-up and incipient melting in the heat-affected zone.

Another technique for bonding parts made of different alloys is by diffusion bonding as applied to nickel-base alloys. However, this method is currently not considered sufficiently reliable for producing dual alloy disks.

Another method is referred to as bicasting, or casting one portion of an article, such as a rim, directly against another portion, such as a wrought or a forged hub. This method provides an undesirable mechanical joint, as distinguished from a metallurgical joint. Further, the fact that one portion of the article is necessarily cast means that at least that portion may contain characteristic casting defects, such as inhomogeneities, shrinkage, inclusions and porosity. The presence of such defects is undesirable for a high speed rotating part.

Billets made by coextrusion and isoforging, in which a core is made from one alloy and an outer portion is made from another alloy, have been manufactured with relatively little difficulty. However, additional development is needed to develop forging procedures to control the precise location and shape of the interface between the joined parts.

Explosive welding has been used to weld combinations of dissimilar alloys. This process has been found to be useful for cladding one alloy onto the surface of another. Such a process is, however, not presently usable for joining dual alloy disks, as the configuration of the joint region of such disks is not suitable for the introduction of explosive energy for bonding a hub to a rim.

SUMMARY OF THE INVENTION

It is an object of the present invention to provide an article by joining together separate parts, such as a separate hub portion of a material having maximized tensile strength and resistance to low cycle fatigue crack propagation in order to assure a long turbine disk life and a separate rim portion of a material having excellent high temperature creep resistance and stress rupture strength as well as superior hold-time fatigue crack growth resistance to form an integral turbine disk having a substantially defect-free joint region.

It is an object of the present invention to provide a turbine disk having a hub portion made from one superalloy composition joined to a rim portion made from a different superalloy composition.

Another object of this invention is to provide a metallic article composed of different alloys in which the mechanical properties of one portion of the article vary from the mechanical properties of another portion of the article.

It is a further object of this invention to provide a metallic article composed of one superalloy joined to another portion composed of a different superalloy, the joint region being substantially free from defects.

Still another object of this invention is to provide a gas turbine disk having improved tensile properties and low cycle fatigue crack growth resistance in its hub portion and improved hold time fatigue crack growth resistance, creep and stress rupture resistance in its rim portion.

Another object of the present invention is a dual alloy disk having a sound metallurgical joint between a hub, made from a first alloy, and a rim, made from a second alloy, substantially all of the contaminants and defects having been removed from the interface region as a result of extensive local deformation in this region coupled with expulsion of potentially defect-bearing material into cavities formed in specially configured dies.

In accordance with the present invention, an integral article made from at least two different parts having different mechanical properties is disclosed. The different parts are preformed so that adjacent surfaces of adjoining parts approximately conform to one another. The parts are placed in a special closed die and joined together in their plastic temperature ranges using a joining technique which expels potentially defect-laden material from the joint region, yielding an integral dual alloy article having differing properties in different portions with a substantially defect-free joint region.

In one embodiment, a turbine disk having two parts made from different alloys is disclosed. One part is a rim made from an alloy having good hold time fatigue crack growth resistance, high stress rupture resistance and creep resistance. A second part, a hub or bore, is made from an alloy having high tensile strength and good low cycle fatigue crack resistance. The hub and the rim are preformed so that their adjacent mating or interface surfaces approximately conform to one another. The hub and the rim are then metallurgically joined together by a special joining technique. While the hub and the rim are at least at the minimum temperature in their plastic temperature ranges, they are brought together in a closed die. The closed die completely surrounds the parts to be joined, except that a cavity in the die is located adjacent to a joint region where the approximately conforming surfaces meet. Upon application of forging forces, the hub and the rim are joined together in a joint region, while potentially defect-laden material from the joint region is expelled into the die cavity so that the joint region is substantially defect-free. As employed herein, the term "approximately conforming surfaces" refers to those respective surfaces of the parts to be joined together which are specifically designed and prepared to encourage the expulsion of potentially defect-laden material from the joint region upon application of forging forces.

The term "balance essentially nickel" is used to include, in addition to nickel in the balance of the alloy, small amounts of impurities and incidental elements, which in character and/or amount do not adversely affect the advantageous aspects of the alloy.

These and various other objects, features and advantages of the invention can be best understood from the following detailed description taken in conjunction with the accompanying drawings.

DETAILED DESCRIPTION OF THE INVENTION

Figure 1:
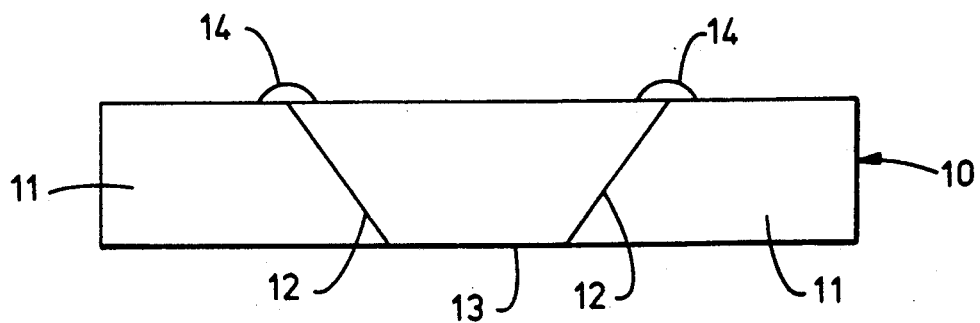
FIG. 1 is a cross-sectional view of a turbine disk hub and a rim joined together by the joining method disclosed herein.

Articles having different mechanical properties in different regions find use in applications in which the different regions of the articles are subject to different operating environments requiring different mechanical properties. When these nonuniform operating conditions become so severe that one homogeneous material is unable to meet the varying mechanical properties requirements, then an article made from two different materials, known as a composite, is necessary. As used herein, the term "composite" refers to an article made from two or more materials, metals or alloys, each having a different composition or different mechanical properties, or both.

In accordance with the present invention an article may have portions made from the same alloy, each portion having been thermo-mechanically treated so that it possesses the mechanical properties required for a particular portion of the article. The article of the invention may also be made from different alloys of the same family (e.g., nickel-base alloys), each alloy selected to satisfy the mechanical property requirements of a particular portion of the article. The invention also contemplates articles wherein different portions are made of alloys or metals of different families (e.g., titanium-base alloys with iron base-alloys).

In certain embodiments of the present invention, each part or portion of a turbine disk is formed from high quality superalloy powders of a specific composition. The powder is processed into a billet using a compaction and extrusion process which may be further processed in this form, or which may subsequently be forged into a preform. The resulting product then may be formed into a hub or a rim having discrete, preformed interfaces which may subsequently be treated to develop specific mechanical properties. It will be understood that the specific treatment given to a preform will vary with the alloy selected and the mechanical properties desired. In one embodiment, the hub and rim preforms are made from nickel-base superalloys, each having two phases, a gamma matrix and a gamma prime precipitate. The gamma prime forms on cooling and on aging or dissolves on heating above a temperature referred to as the solvus temperature. Temperatures above the solvus are referred to as the supersolvus temperature. The hub and rim preforms may be solution treated in their supersolvus temperature range for a sufficient time to allow the gamma prime phase to enter into solution in the gamma matrix. The hub and rim preforms are then quenched so that an initial uniform gamma prime phase is precipitated, followed by an aging treatment at a temperature below the supersolvus temperature for a sufficient time to generate a fine gamma prime phase within the gamma matrix of the appropriate grain size.

As disclosed in copending application Ser. No. 07/417,098, a preferred superalloy from which the rim is made has a composition of about 10.7% to 19.2% cobalt, about 10.8% to about 14.0% chromium, about 3.3% to about 5.8% molybdenum, about 1.9% to 4.7% aluminum, about 3.3% to 5.6% titanium, about 0.9% to about 2.7% niobium, about 0.005% to 0.042% boron, 0.01 to about 0.062% carbon, 0 to about 0.062% zirconium, optionally 0 to about 0.32% hafnium, and the balance essentially nickel.

As disclosed in copending application Ser. No. 07/417,097, a preferred superalloy from which the hub is made has a composition of about 11.8% to 18.2% cobalt, about 13.8% to 17.2% chromium, about 4.3% to 6.2% molybdenum, about 1.4% to 3.2% aluminum, about 3.0% to 5.4% titanium, about 0.90% to 3.2% niobium, about 0.005% to 0.040% boron, about 0.010% to 0.090% carbon, about 0.010% to about 0.090% zirconium, optionally tungsten from about 3.0% to about 6.0%, optionally an element selected from the group consisting of hafnium and tantalum up to about 0.4% and the balance essentially nickel. Tungsten, optionally used in one of the embodiments of this alloy, increases the strength of the superalloy, but undesirably increases its density.

The only design limitation in the composite articles of the present invention is that adjacent portions of the parts must be properly configured so that they may be joined together by a joining method in a closed die having a cavity adjacent a joint region, thereby yielding a joint region substantially free of deleterious defects. Also, the alloys comprising the parts must be compatible, that is, they must be capable of forming a metallurgical bond in a joint region.

An article is made from different parts. The first part may be made from a different superalloy than the second part, or the first part may be from the same superalloy which has received a different thermo-mechanical treatment than the second part so that each part exhibits different mechanical properties. Expelled material from a joint region forms a rib on the top surface of the integral joined article which is a result of the joining process. The rib 4 may contain defects such as cracks and oxide inclusions typical of those resulting from joining processes and may be removed during subsequent processing by conventional removal techniques. The final shape of the joint region 5 is a function of the starting configuration of the joined parts and is conical in this example.

FIG. 1 depicts a dual alloy turbine disk 10 having a creep-resistant and hold time fatigue crack resistant alloy rim 11 and a low cycle fatigue resistant alloy hub 13 having high tensile strength. As disclosed in copending application Ser. No. 07/417,095, rim 11 and hub 13 are first preformed in an axisymmetric manner so that adjacent surfaces of hub 13 and rim 11 approximately conform to each other. preforming may be by any known technique such as by machining or shaping. Hub 13 and rim 11 are then metallurgically joined to one another using a joining process so that a joint region 12 is formed between hub 13 and rim 11 by placing the hub within the rim in a closed die and heating to a minimum temperature required so that both the hub alloy and the rim alloy are within their respective plastic deformation temperature ranges. Preferably, the hub and the rim are heated to the minimum temperature required to permit superplastic deformation in both alloys. The closed die has a cavity located adjacent to and coextensive with the joint region. After forging, potentially defect-laden material 14 from the joint region is expelled into the cavity. Material 14 is removed in subsequent processing.

Forging in a closed die of the type described herein in connection with joining entails shaping of hot metal completely within the walls or cavities of two die portions that come together to enclose the workpiece on all sides. The impression for the forging may be entirely in either the top die portion, the bottom die portion or divided between the die portions. Forgings may be either blocker-type, conventional or close tolerance, although close tolerance types are preferred.

The starting preformed portions need not be in a particular form, for example, as-cast, forged or extruded. Also, extensive plastic deformation can be imparted to either member prior to joining. Deformation during joining is typically confined to the relatively small region near the joint. The location of the interface between the parts can be controlled by machining the portions to be joined. Although parts having conical interfaces yielding conical joints are disclosed, many other possible alternative embodiments exist. The joint may consist of one member having a compound (two different apex angles) surface. Both members may have compound surfaces. Surfaces of complex curvature may also be used. Each of these combinations is intended to be encompassed by the term "approximately conforming" surfaces. One criterion to be used in selecting a joint configuration is whether the configuration is effective in expelling original surface materials from the completed joint into the space or cavity adjacent to the joint.

Either portion may be heat treated by conventional processes prior to joining provided that the structure developed during the heat treatment would not be adversely affected by the joining process, and provided that the heat treated structure does not adversely affect the joining process.

A dual alloy turbine disk having improved properties in each area of the disk will allow for resulting improvements in engine operating efficiency by permitting larger disks that can satisfy the creep resistance requirements as well as the hold time fatigue crack growth requirements of the rim portion at higher temperatures, while maintaining the desired strength required in the hub portion of the disk subjected to lower temperatures, but higher stresses. Thus, the limitations that have been encountered by single alloy disks at higher operating temperatures may be overcome.

The hub material is typically selected to maximize resistance to low cycle fatigue crack propagation while the rim material is selected to maximize hold time fatigue crack growth resistance, creep resistance and stress rupture resistance in order to ensure long turbine life.

The dual alloy disk of the present invention, when manufactured in accordance with the inventive methods of related application Ser. No. 07/417,095 is itself an inventive product due to its potential to be relatively defect-free, especially in the joint region. The following specific examples describe the articles contemplated by the present invention. Many of the alloy combinations have been joined together as either mock-ups of full-size turbine disks or as rectangularly-shaped coupons. They are intended for illustrative purposes only and should not be construed as a limitation.

EXAMPLE 1

The turbine disk 10 of FIG. 1 in which rim 11 is made from a superalloy designated as Alloy SR3 having in weight percent about 10.9% to about 12.9% cobalt, about 11.8% to about 13.8% chromium, about 4.6% to about 5.6% molybdenum, about 2.1% to about 3.1% aluminum, about 4.4% to about 5.4% titanium, about 1.1% to about 2.1% niobium, about 0.005% to about 0.025% boron, about 0.01% to about 0.06% carbon, 0 to about 0.06% zirconium, 0 to about 0.3% hafnium, and the balance essentially nickel.

EXAMPLE 2

The turbine disk 10 of FIG. 1 in which rim 11 is made from a superalloy designated as Alloy KM4 having in weight percent about about 17.0% to about 19.0% cobalt, about 11.0% to about 13.0% chromium, about 3.5% to about 4.5% molybdenum, about 3.5% to about 4.5% aluminum, about 3.5% to about 4.5% titanium, about 1.5% to about 2.5% niobium, about 0.01% to about 0.04% boron, about 0.01% to about 0.06% carbon, 0 to about 0.06% zirconium, and the balance essentially nickel.

EXAMPLE 3

The turbine disk 10 of FIG. 1 in which hub 13 is made from a superalloy designated as Alloy A3 having in weight percent about 16% to about 18% cobalt, about 14% to about 16% chromium, about 4.5% to about 5.5% molybdenum, about 2% to about 3% aluminum, about 4.2% to about 5.2% titanium, about 1.1% to about 2.1% niobium, about 0.020% to about 0.040% boron, about 0.040% to about 0.080% carbon, about 0.040% to about 0.080% zirconium and the balance essentially nickel.

EXAMPLE 4

The turbine disk 10 of FIG. 1 in which hub 13 is made from a superalloy designated as Alloy W5 having in weight percent about 12% to about 14% cobalt, about 15% to about 17% chromium, about 5.0% to about 6.0% molybdenum, about 1.6% to about 2.6% aluminum, about 3.2% to about 4.2% titanium, about 1.5% to about 2.5% niobium, about 0.005% to about 0.025% boron, about 0.010% to about 0.050% carbon, about 0.010% to about 0.050% zirconium, optionally an element selected from the group consisting of hafnium and tantalum up to about 0.3% and the balance essentially nickel.

EXAMPLE 5

The turbine disk 10 of FIG. 1 in which hub 13 is made from a superalloy designated as Alloy KM2 having in weight percent about 17% to about 19% cobalt, about 15% to about 17% chromium, about 4.5% to about 5.5% molybdenum, about 2.5% to about 3.5% tungsten, about 2% to about 3% aluminum, about 2.5% to about 3.5% titanium, about 2.5% to about 3.5% niobium, about 0.020% to about 0.040% boron, about 0.030% to about 0.070% carbon, about 0.030% to about 0.070% zirconium and the balance essentially nickel.

EXAMPLE 6

The turbine disk 10 of FIG. 1 in which rim 11 is made of a superalloy designated as Rene'88 having in weight percent about 12% to about 14% cobalt, about 15% to about 17% chromium, about 3.5% to about 4.5% molybdenum, about 3.5% to about 4.5% tungsten, about 1.5% to about 2.5% aluminum, about 3.2% to about 4.2% titanium, about 0.5% to about 1.0% niobium, about 0.01% to about 0.04% boron, about 0.01% to about 0.06% carbon, about 0.01% to about 0.06% zirconium, 0% to about 0.01% vanadium, 0% to about 0.3% hafnium, 0% to about 0.01% yttrium and the balance essentially nickel.

EXAMPLE 7

The turbine disk 10 of FIG. 1 in which hub 13 is made of a superalloy designated as Rene 88 having in weight percent about 12% to about 14% cobalt, about 15% to about 17% chromium, about 3.5% to about 4.5% molybdenum, about 3.5% to about 4.5% tungsten, about 1.5% to about 2.5% aluminum, about 3.2% to about 4.2% titanium, about 0.5% to about 1.0% niobium, about 0.01% to about 0.04% boron, about 0.01% to about 0.06% carbon, about 0.01% to about 0.06% zirconium, 0% to about 0.01% vanadium, 0% to about 0.3% hafnium, 0% to about 0.01% yttrium and the balance essentially nickel.

EXAMPLE 8

The turbine disk of FIG. 1 in which hub 13 is made from a superalloy designated as Rene'95 having in weight percent about 7% to about 9% cobalt, about 12% to about 14% chromium, about 3.3% to about 3.7% molybdenum, about 3.3% to about 3.7% tungsten, about 3.3% to about 3.7% aluminum, about 2.3% to about 2.7% titanium, about 3.3% to about 3.7% niobium, about 0.03% to about 0.7% zirconium, about 0.04% to about 0.09% carbon, about 0.006% to about 0.015% boron and the balance essentially nickel.

EXAMPLE 9

The turbine disk of FIG. 1 in which rim 11 is made from a superalloy designated as HK-36 nominally having in weight percent about 15% cobalt, about 10% chromium, about 3% molybdenum, about 5.5% aluminum, about 2.25% titanium, about 2.7% tantalum, about 1.35% niobium, about 0.06% zirconium, about 1.0% vanadium, about 0.05% carbon, about 0.03% boron and the balance essentially nickel.

EXAMPLE 10

The turbine disk of FIG. 1 in which rim 11 is made from Alloy SR3 and hub 13 is made from Alloy A3.

EXAMPLE 11

The turbine disk of FIG. 1 in which rim 11 is made from Alloy SR3 and hub 13 is made from Alloy W5.

EXAMPLE 12

The turbine disk of FIG. 1 in which rim 11 is made from Alloy SR3 and hub 13 is made from Rene'95.

EXAMPLE 13

The turbine disk of FIG. 1 in which rim 11 is made from Alloy SR3 and hub 13 is made from Alloy KM2.

EXAMPLE 14

The turbine disk of FIG. 1 in which rim 11 is made from Alloy SR3 and hub 13 is made from Rene'88.

EXAMPLE 15

The turbine disk of FIG. 1 in which rim 11 is made from Alloy KM4 and hub 13 is made from Alloy A3.

EXAMPLE 16

The turbine disk of FIG. 1 in which rim 11 is made from Alloy KM4 and hub 13 is made from Alloy W5.

EXAMPLE 17

The turbine disk of FIG. 1 in which rim 11 is made from Alloy KM4 and hub 13 is made from Rene'95.

EXAMPLE 18

The turbine disk of FIG. 1 in which rim 11 is made from Alloy KM4 and hub 13 is made from Alloy KM2.

EXAMPLE 19

The turbine disk of FIG. 1 in which rim 11 is made from Alloy KM4 and hub 13 is made from Rene'88.

EXAMPLE 20

The turbine disk of FIG. 1 in which rim 11 is made from HK-36 and hub 13 is made from Alloy A3.

EXAMPLE 21

The turbine disk of FIG. 1 in which rim 11 is made from HK-36 and hub 13 is made from Alloy W5.

EXAMPLE 22

The turbine disk of FIG. 1 in which rim 11 is made from HK-36 and hub 13 is made from Rene'.

EXAMPLE 23

The turbine disk of FIG. 1 in which rim 11 is made from HK-36 and hub 13 is made from Rene'88.

EXAMPLE 24

The turbine disk of FIG. 1 in which rim 11 is made from HK-36 and hub 13 is made from Alloy KM2.

EXAMPLE 25

The turbine disk of FIG. 1 in which rim 11 is made from Rene'88 and hub 13 is made from Alloy A3.

EXAMPLE 26

The turbine disk of FIG. 1 in which rim 11 is made from Rene'88 and hub 13 is made from Alloy W5.

EXAMPLE 27

The turbine disk of FIG. 1 in which rim 11 is made from Rene'88 and hub 13 is made from Alloy KM2.

EXAMPLE 28

The turbine disk of FIG. 1 in which rim 11 is made from Rene'88 and hub 13 is made from Rene'88, where the rim and the hub have been processed to achieve different mechanical properties.

In examples 1-27 of the present invention, the hub alloy is of a superalloy having a relatively low gamma prime volume fraction (e.g., calculated to be on the order of 40-50%) in relation to the superalloy of the rim (e.g., calculated to be on the order of 45-65%). This approach is predicted to give the best balance of tensile, low cycle fatigue and crack growth in the hub together with creep, crack growth and hold time fatigue crack growth in the rim. However, this approach will probably require some form of differential heat treatment, which is likely to be difficult. In this situation, the gamma prime solvus temperature of the hub alloy would generally be less than the gamma prime solvus temperature of the rim alloy.

In another embodiment of the present invention, Example 29 below, a superalloy having a relatively high gamma prime volume fraction may be preformed into the hub portion of a dual alloy disk, while a superalloy having a lower gamma prime volume fraction may be preformed into a rim. This could mean that the hub alloy would have a higher gamma prime solvus ($T_H$) than the rim alloy ($T_R$). Consequently, it should be possible to heat treat the dual alloy disk at a temperature T, where $T_H > T > T_R$ such that the hub of the component remains fine grain (e.g., ASTM 10 or finer) and the rim grain size is coarsened (e.g., ASTM 9 or coarser). This concept would provide excellent tensile and low cycle fatigue properties in the hub but would result in a degradation of crack growth properties. The creep properties of the rim alloy would be similar to that in which a high gamma prime volume fraction alloy is used, but the hold time crack growth resistance may be reduced.

A specific example of the dual alloy disk of the present invention is provided in which the rim alloy has a relatively low volume fraction of gamma prime, and a lower gamma prime solvus temperature, and the hub alloy has a higher volume fraction of gamma prime, and a higher gamma prime solvus temperature, thus permitting a uniform heat treatment of an integral disk at a temperature intermediate between these gamma prime solvus temperatures in order to develop the desired properties. Although this specific example describes an article contemplated by the present invention, it is intended for illustrative purposes only and should not be construed as a limitation, as other superalloys having the above characteristics may be combined to yield the present invention.

EXAMPLE 29

The turbine disk of FIG. 1 in which rim 11 is made from Rene'88 and hub 13 is made from Rene'95.

Although the present invention has been described with reference to the foregoing specification, many modifications, combinations, and variations of the invention will be apparent to those skilled in the art in light of the above teachings. It is therefore understood that changes may be made to the particular embodiments of the invention which are within the full scope of the invention as defined by the following claims.

What is claimed is:

1. A dual alloy turbine disk including a rim of a first metal;
said disk further including a hub of a second metal;
said hub and said rim having approximately conforming preformed surfaces being metallurgically joined together at a joint region in a closed die, said die having a cavity adjacent to said joint region for receiving potentially defect-laden material from said joint region during joining, thereby rendering said joint region substantially defect free and forming said disk as an integral forged article of manufacture, said joint region further having been deformed during joining.

2. The turbine disk of claim 1 wherein said rim consists essentially of an alloy having about 10.7% to 19.2% cobalt, about 10.8% to 14.0% chromium, about 3.3% to 5.8% molybdenum, about 1.9% to 4.7% aluminum, about 3.3% to 5.6% titanium, about 0.9% to 2.7% niobium, 0 to about 0.32% hafnium, about 0.005% to 0.042% boron, 0 to about 0.062% carbon, 0 to about 0.062% zirconium and the balance essentially nickel.

3. The turbine disk of claim 1 wherein said hub consists essentially of an alloy having about 11.8% to 18.2% cobalt, about 13.8% to 17.2% chromium, about 4.3% to 6.2% molybdenum, about 1.4% to 3.2% aluminum, about 3.0% to 5.4% titanium, about 0.9% to 3.2% niobium, about 0.005% to 0.040% boron, about 0.010% to 0.090% carbon, about 0.010% to 0.090% zirconium, optionally tungsten from about 3.0% to about 6.0%, an element selected from the group consisting of hafnium and tantalum from 0 to about 0.4%, and the balance essentially nickel.

4. The turbine disk of claim 1 wherein the alloy of said rim is one selected from the group consisting of Alloy SR3, Alloy KM4, and HK-36.

5. The turbine disk of claim 1 wherein the alloy of said hub is one selected from the group consisting of Alloy A3, Alloy W5, Alloy KM2, and Rene'88.

6. The turbine disk of claim 1 wherein the alloy of said rim is one selected from the group consisting of Alloy SR3, Alloy KM4, and HK-36 and wherein the alloy of said hub is one selected from the group consisting of Alloy A3, Alloy W5, Alloy KM2, and Rene'88.

7. A dual alloy turbine disk including a rim of a first alloy having high creep resistance and hold time fatigue crack growth resistance;
said disk further including a hub of a second alloy having high tensile strength and low-cycle fatigue crack growth resistance;
said hub and said rim having approximately conforming preformed surfaces being metallurgically joined together throughout a joint region in a closed die, said die having a cavity adjacent to said joint region for receiving potentially defect-laden material from said joint region into said cavity during joining thereby rendering said joint region substantially defect free and forming disk as an integral forged article of manufacture, said joint region further having been deformed during joining.

8. The turbine disk of claim 7 wherein said rim consists essentially of an alloy having about 10.7% to 19.2% cobalt, about 10.8% to 14.0% chromium, about 3.3% to 5.8% molybdenum, about 1.9% to 4.7% aluminum, about 3.3% to 5.6% titanium, about 0.9% to 2.7% niobium, 0 to about 0.32% hafnium, about 0.005% to 0.042% boron, 0 to about 0.062% carbon, 0 to about 0.062% zirconium and the balance essentially nickel.

9. The turbine disk of claim 7 wherein said hub consists essentially of an alloy having about 11.8% to 18.2% cobalt, about 13.8% to 17.2% chromium, about 4.3% to 6.2% molybdenum, about 1.4% to 3.2% aluminum, about 3.0% to 5.4% titanium, about 0.9% to 3.2% niobium, about 0.005% to 0.040% boron, about 0.010% to 0.090% carbon, about 0.010% to 0.090% zirconium, optionally tungsten from about 3.0% to about 6.0%, optionally an element from the group consisting of hafnium and tantalum from 0 to about 0.4% and the balance essentially nickel 10. The turbine disk of claim 7 wherein the alloy of said rim is one selected from the group consisting of Alloy SR3 Alloy KM4, and HK-36.

11. The turbine disk of claim 7 wherein the alloy of said hub is one selected from the group consisting of Alloy A3, Alloy W5, Alloy KM2, and Rene'88.

12. The turbine disk of claim 7 wherein the alloy of said rim is one selected from the group consisting of Alloy SR3, Alloy KM4, and HK-36 and wherein the alloy of said hub is one selected from the group consisting of Alloy A3, Alloy W5, Alloy KM2, and Rene'88.

13. The dual alloy turbine disk of claim 7 further including a superalloy hub having a gamma prime solvus temperature which is higher than the gamma prime solvus temperature of a superalloy rim.

14. The dual alloy turbine disk of claim 1 wherein the metal of the rim is a first superalloy, and the metal of the hub is a second superalloy, the second superalloy having a low volume fraction of gamma prime in comparison to the gamma prime of the first superalloy.

15. The dual alloy turbine disk of claim 14 wherein the gamma prime volume fraction of the first superalloy is about 45% to about 65%.

16. The dual alloy turbine disk of claim 14 wherein the gamma prime volume fraction of the second superalloy is about 40% to about 50%.

17. The dual alloy turbine disk of claim 1 wherein the metal of the rim is a first superalloy and the metal of the hub is a second superalloy, the second superalloy having a gamma prime solvus temperature which is lower than the gamma prime solvus temperature of the first superalloy.

* * * * *